Jan. 14, 1941.  W. A. COLLINS  2,228,689
AUXILIARY TRANSPORTING TRUCK FOR AUTOMOBILES
Filed June 22, 1940  2 Sheets-Sheet 1
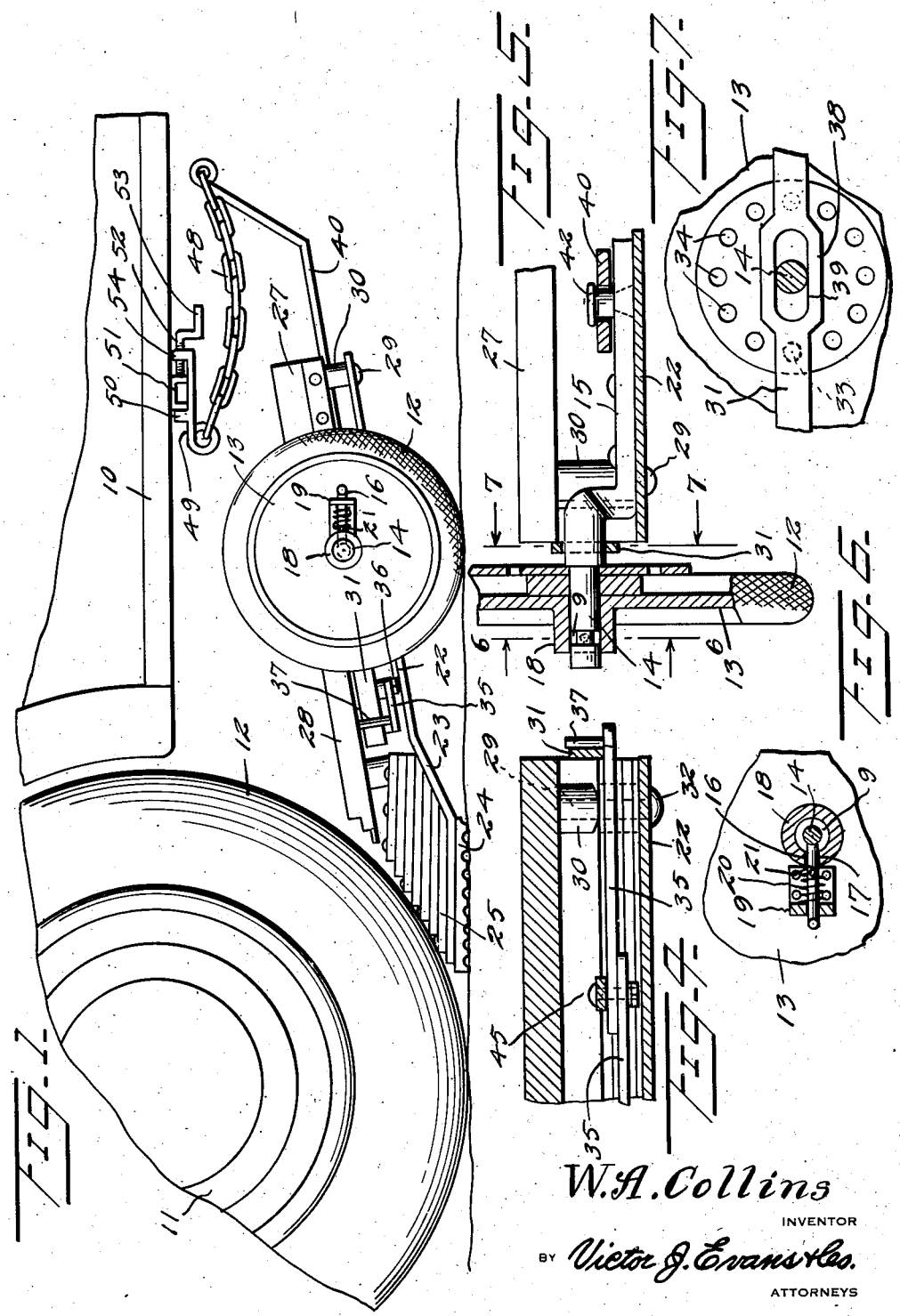
W. A. Collins
INVENTOR
BY Victor J. Evans & Co.
ATTORNEYS Jan. 14, 1941.   W. A. COLLINS   2,228,689
AUXILIARY TRANSPORTING TRUCK FOR AUTOMOBILES
Filed June 22, 1940   2 Sheets-Sheet 2
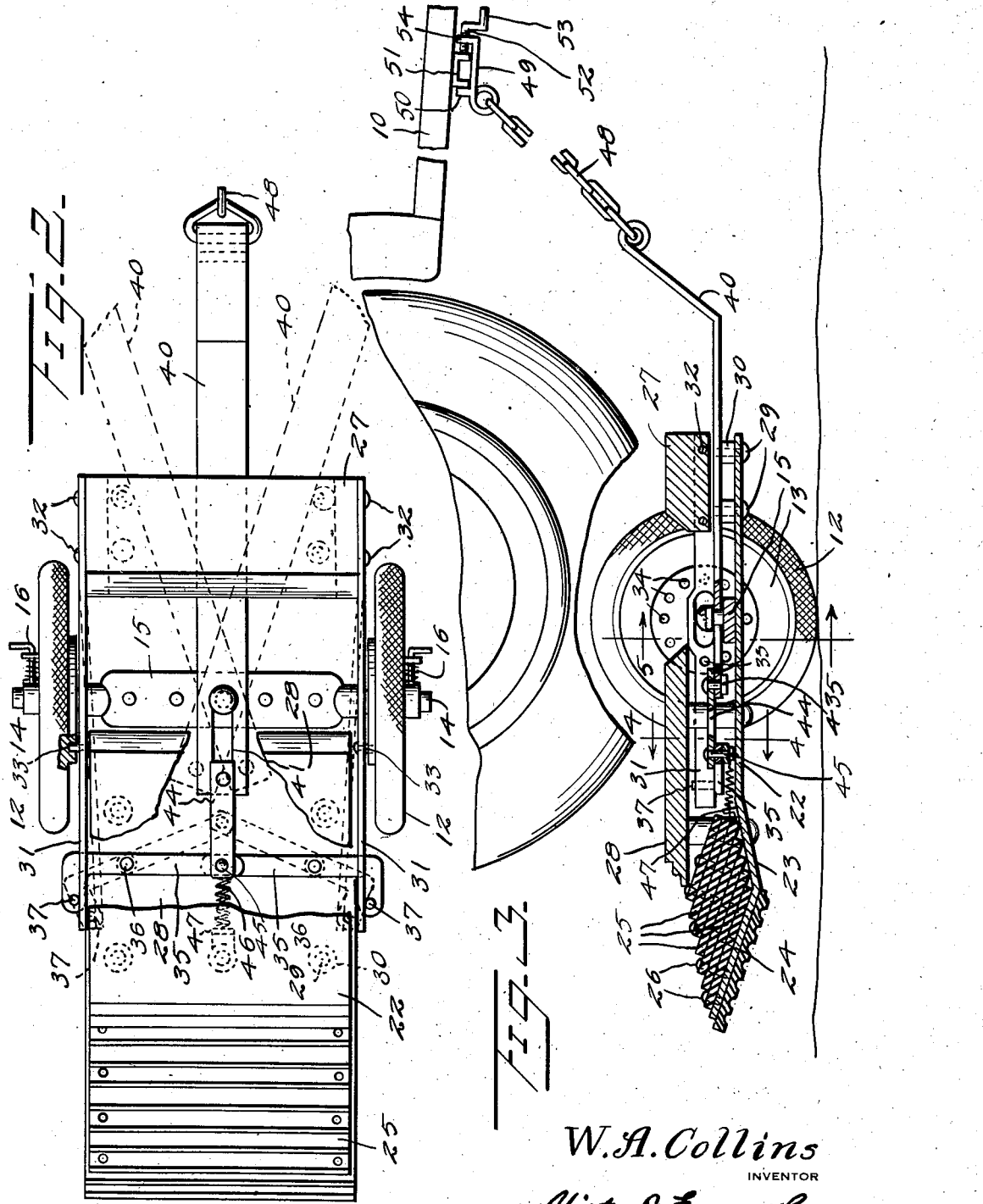
W. A. Collins
INVENTOR
BY Victor J. Evans & Co.
ATTORNEYS Patented Jan. 14, 1941

2,228,689

UNITED STATES PATENT OFFICE 2,228,689

AUXILIARY TRANSPORTING TRUCK FOR AUTOMOBILES

William A. Collins, Farmville, Va.

Application June 22, 1940, Serial No. 341,951

4 Claims. (Cl. 280—61)

This invention relates to an auxiliary transporting truck for automobiles and has for an object to provide emergency transporting means for automotive vehicles when the tires on such vehicles are damaged, the device being adapted to permit the operator of the vehicle to proceed at reduced speed to a service station where the tire damage may be repaired.

A further object is to provide a simplified emergency transporting means consisting essentially of a two-wheel vehicle, a rubber lifting wedge, a draw bar attached to the axle of the vehicle, locking clutches in both wheels, means for automatically releasing the clutches when the damaged tire on the motor vehicle has been run up on the device by a chain attached to the draw bar and to the motor vehicle.

A further object is to provide a device of this character which is simple in operation, the device being placed in front of the wheel having the damaged tire, the chain then attached to a suitable part of the motor vehicle, the operator then driving onto the device, the damaged tire and wheel first climbing up the wedge then onto the device body until the center of vehicle wheel passes over the axle of the device which operation causes the front end of the device to lower with the resultant rocking up of the rear end to clear the ground, the towing chain now acting upon the draw bar which through levers attached thereto releases the wheel clutches to allow the transporting wheels of the device to roll freely.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of an auxiliary transporting truck for automobiles in initial applied position.

Figure 2 is a plan view of the device showing the pivotal mounting of the draw bar to accommodate steering and showing the wheel locking devices in dotted lines in released position.

Figure 3 is a longitudinal sectional view of the device in towing position showing the vehicle wheel elevated thereupon.

Figure 4 is a detail cross sectional view taken on the line 4—4 of Figure 1 showing the cam pin, bell crank lever, and spring which carries the locking pin for one of the wheels of the device.

Figure 5 is a detail cross sectional view taken on the line 5—5 of Figure 3.

Figure 6 is a detail cross sectional view taken on the line 6—6 of Figure 5.

Figure 7 is a detail cross sectional view taken on the line 7—7 of Figure 5.

Referring now to the drawings in which like characters of reference designate similar parts in the various views, 10 designates the runningboard, 11 a rear wheel, and 12 the tire thereof of an automobile. The auxiliary transporting truck for elevating the rear wheel, or any other wheel, which may be damaged, or be in need of tire repairs, comprises a pair of rubber-tired ground wheels 13 which are adapted to be detachably mounted on the spindles 14 of an axle 15 by pins 16 which extend through respective openings 17 in the wheel hubs 18, as best shown in Figure 4. Each pin slidably projects through an angular bracket 19 secured to the wheel. A spring 20 is sleeved on the pin between the outer end of the bracket and a stop 21 on the pin to releasably hold the pin in a groove 9 in the axle spindle. This arrangement permits storing the wheels in a compact space when the device is knocked down for transportation in the baggage compartment of the automobile.

Mounted on the axle 15 is a frame comprising a base plate 22 having a downwardly inclined rear end 23, best shown in Figure 3, which terminates in an angularly directed roughened shoe 24. A rubber wedge formed of stepped rubber plates 25 is secured to the shoe and downwardly bent rear portion 23 of the base plate by bolts 26.

Front and rear transversely disposed plates 27 and 28 are secured to the base plate by bolts 29, there being spacers 30 on the bolts which elevate the plates above the axle. The plates form a platform with a transverse space between them to receive the vehicle wheel with the damaged tire, as best shown in Figure 3.

A pair of leaf springs 31 are bolted at the front ends to the longitudinal edges of the front plate 27, as shown at 32, and these leaf springs form operating means for the clutches of the wheels 13. A clutch pin 33 is secured to each spring intermediate its ends and is adapted to be selectively engaged in an annular series of openings 34 of the wheel 13, disposed concentric with the axle spindle 14 to lock the respective wheel stationary.

For releasing the pins 33 a pair of bell crank levers 35 are pivotally secured intermediate the ends of their long arms to the base plate 22 by respective pivot pins 36, as best shown in Figure 2. The short arms of the bell crank levers are provided with upstanding respective cam pins 37. These pins normally lie along the outer sides of the rear ends of the leaf springs 31 and when the bell crank levers are rocked on their pivots the springs impinge against the rear ends of the leaf spring and deform the rear ends toward the longitudinal axis of the truck thus withdrawing the clutch pins 33 from the openings 34 in the wheels to de-clutch the wheels so that they may roll freely.

As best shown in Figure 7, the leaf springs 31 are provided with enlarged intermediate portions 38 provided with slots 39 to receive the spindles 14 of the axle and thus the leaf springs are carried past the axle and permit the pins 33 to properly register interchangeably with the openings 34.

A draw bar 40 is disposed above the axle and at its rear end is provided with a longitudinal slot 41, best shown in Figure 2, to receive a pintle 42 carried by the axle, as best shown in Figure 5. Thus the draw bar can move forwardly to a limited extent on the pintle. Pivotally secured to the rear end of the draw bar as shown at 43 in Figure 3 is a link 44. The rear end of the link is secured by a pivot pin 45 to the overlapped inner ends of the long arms of the bell crank levers 35. Thus when the draw bar is pulled forward the bell crank levers are rocked to move the leaf springs 31 for withdrawing the clutch pins 33 to permit the wheels to roll freely.

A helical spring 46 is secured to the rear end of the link 44 and is secured to an angular bracket 47 on the base plate 22 to yieldably hold the draw bar at its rearward limit of movement on the pintle and thus position the bell crank levers 35 in their neutral position so that the clutch pins 33 will normally be engaged in the openings 34 in the wheels 13 to lock the wheels stationary.

A chain 48, or other flexible member, is secured to the front end of the draw bar and is secured to a latch bar 49 having a tongue 50 which is received between the branches of an inverted U-shaped bracket 51 mounted on the running board 10. A set screw 52 having a handle 53 is threadedly engaged through an upturned lug 54 on the latch bar and bears against the bracket to detachably connect the latch bar to the bracket.

In operation the stepped lifting wedge device 25 is placed in front of the wheel having the damaged tire. The chain 48 is then attached to the bar 49. The operator starts the vehicle and drives up onto the platform formed by the plates 27 and 28. The wheel progresses on the platform until it arrives at the space between the plates 27 and 28 at which point it is directly over the axle 15. This causes the front end of the platform to go down and the rear end of the platform to rock up and lift the rubber wedge clear of the ground. The slack in the chain 48 is now taken up and tension is exerted on the draw bar, which moves forwardly on the pintle 42 to rock the bell crank levers 37 to move the leaf springs 31 and release the clutch pins 33 from the openings 34 of the wheel thus permitting the wheels to roll freely so that the automobile may be driven at slow speed to the nearest service station where repairs may be made.

When the device is to be used on a front wheel, it is necessary that the draw bar swing to accommodate steering. The draw bar can swing on its pintle laterally on either side of the longitudinal axis of the device as shown by dotted lines 10 in Figure 2.

From the above description it is thought that the construction and operation of the invention will be fully understood without further explanation.

What is claimed is:

1. An emergency transporting truck for damaged wheels of a motor vehicle comprising a platform, a pair of wheels supporting the platform, the platform being adapted to tilt on the wheels from an inclined loading position to horizontal transporting position when a damaged vehicle wheel is driven onto the platform to a position between the wheels of the platform, a draw bar mounted for limited sliding movement on the platform adapted to be connected to a motor vehicle for towing the wheeled platform with said vehicle wheel elevated thereupon, and clutch means locking the wheels of the platform against rotation and connected to the draw bar to be released by forward sliding movement of the draw bar to permit the wheels of the platform to turn freely.

2. The structure as in claim 1 and in which the platform is provided at the rear end with a wedge shaped member adapted to guide a damaged vehicle wheel up onto the platform.

3. The structure as in claim 1 and in which said clutch means comprises leaf springs connected at the forward ends to the sides of the platform, pins on the leaf springs adapted to be interchangeably received in openings in the wheels of the platform, bell crank levers pivoted on the platform, pins on the bell crank levers adapted to engage the leaf springs and move the leaf springs to disengage the first-named pins from the openings in the wheels, and means connecting the bell crank levers to the sliding draw bar.

4. An emergency transporting truck for damaged wheels of a motor vehicle comprising a platform, a pair of wheels supporting the platform, the platform being adapted to tilt on the wheels from an inclined loading position to horizontal transporting position when a damaged vehicle wheel is driven onto the platform to a position between the wheels of the platform, a draw bar mounted for limited sliding movement on the platform adapted to be connected to a motor vehicle for towing the wheeled platform with said vehicle wheel elevated thereupon, clutch means locking the wheels of the platform against rotation and connected to the draw bar to be released by forward sliding movement of the draw bar to permit the wheels of the platform to turn freely, and a spring connected to the platform and to the draw bar for normally holding the draw bar at its rearward limit of movement to hold the clutch means in operative position.

WILLIAM A. COLLINS.